(12) United States Patent
Stuart et al.

(10) Patent No.: US 7,948,897 B2
(45) Date of Patent: May 24, 2011

(54) DELAY MANAGEMENT FOR DISTRIBUTED COMMUNICATIONS NETWORKS

(75) Inventors: Steven B. Stuart, Eden Prairie, MN (US); John M. Hedin, Coon Rapids, MN (US)

(73) Assignee: ADC Telecommunications, Inc., Eden Prairie, MN (US)

( * ) Notice: Subject to any disclaimer, the term of this patent is extended or adjusted under 35 U.S.C. 154(b) by 204 days.

(21) Appl. No.: 11/839,086

(22) Filed: Aug. 15, 2007

(65) Prior Publication Data
US 2009/0046586 A1 Feb. 19, 2009

(51) Int. Cl.
*G01R 31/08* (2006.01)
*G06F 11/00* (2006.01)
*G08C 15/00* (2006.01)
*H04J 1/16* (2006.01)
*H04J 3/14* (2006.01)
*H04L 1/00* (2006.01)
*H04L 12/26* (2006.01)

(52) U.S. Cl. ........ 370/236; 370/232; 370/233; 370/234; 370/235; 398/102

(58) Field of Classification Search .......... 370/236, 370/232–235; 398/102
See application file for complete search history.

(56) References Cited

U.S. PATENT DOCUMENTS

| | | | |
|---|---|---|---|
| 4,183,054 A | 1/1980 | Patisaul et al. | |
| 4,611,323 A | 9/1986 | Hessenmiiller | |
| 4,628,501 A | 12/1986 | Loscoe | |
| 4,654,843 A | 3/1987 | Roza et al. | |
| 4,691,292 A | 9/1987 | Rothweiler | |
| 4,999,831 A | 3/1991 | Grace | |
| 5,193,109 A | 3/1993 | Chien-Yeh Lee | |
| 5,243,598 A | 9/1993 | Lee | |
| 5,321,849 A | 6/1994 | Lemson | |
| 5,339,184 A | 8/1994 | Tang | |
| 5,506,847 A | 4/1996 | Shobatake | |
| 6,205,120 B1 * | 3/2001 | Packer et al. | 370/235 |
| 6,430,160 B1 * | 8/2002 | Smith et al. | 370/252 |
| 6,539,026 B1 * | 3/2003 | Waclawsky | 370/428 |
| 6,647,210 B1 * | 11/2003 | Toyoda et al. | 398/102 |

(Continued)

FOREIGN PATENT DOCUMENTS

EP 0391597 10/1990

(Continued)

OTHER PUBLICATIONS

Grace, Martin K., "Synchronous Quantized Subcarrier Multiplexing for Transport of Video, Voice and Data", "IEEE Journal on Selected Areas in Communications", Sep. 1990, pp. 1351-1358, vol. 8, No. 7, Publisher: IEEE.

(Continued)

*Primary Examiner* — Nick Corsaro
*Assistant Examiner* — Sowmini Nair
(74) *Attorney, Agent, or Firm* — Fogg & Powers LLC

(57) ABSTRACT

A method for programming the delay for a node in a communication system is disclosed. The node receives a selected delay value and a signal path delay value indicating a delay for signals communicated to the node. The signal path delay comprises an aggregation of transport delays calculated by each node for segments of the communication system between the node and a host node. The method further calculates an additional delay necessary to meet the selected delay value.

18 Claims, 4 Drawing Sheets

U.S. PATENT DOCUMENTS

| | | | |
|---|---|---|---|
| 6,690,892 B1 * | 2/2004 | Effenberger | 398/168 |
| 6,700,893 B1 * | 3/2004 | Radha et al. | 370/412 |
| 6,791,949 B1 | 9/2004 | Ryu et al. | |
| 6,977,942 B2 * | 12/2005 | Raisanen | 370/429 |
| 7,035,210 B2 * | 4/2006 | Walles | 370/229 |
| 7,058,050 B2 | 6/2006 | Johansson et al. | |
| 7,113,536 B2 | 9/2006 | Alriksson et al. | |
| 7,161,926 B2 | 1/2007 | Elson et al. | |
| 7,184,920 B2 * | 2/2007 | Sunden et al. | 702/125 |
| 2003/0185571 A1 * | 10/2003 | Lee et al. | 398/102 |
| 2004/0165532 A1 | 8/2004 | Poor et al. | |

FOREIGN PATENT DOCUMENTS

| | | |
|---|---|---|
| GB | EP 391597 A2 * | 10/1990 |
| KR | 1019950704866 | 10/2002 |
| KR | 1020030001491 | 1/2003 |
| KR | 1020030059259 | 7/2003 |
| WO | 9115927 | 10/1991 |
| WO | WO 9115927 A1 * | 10/1991 |

OTHER PUBLICATIONS

Harvey et al., "Cordless Communications Utilising Radio Over Fibre Techniques for the Local Loop", "IEEE International Conference on Communications", Jun. 1991, pp. 1171-1175, Publisher: IEEE.

International Searching Authority, "International Search Report", Feb. 19, 2009, Published in: WO.

* cited by examiner

DELAY MANAGEMENT FOR DISTRIBUTED COMMUNICATIONS NETWORKS

BACKGROUND

Distributed antenna systems are widely used to seamlessly extend coverage for wireless communication signals to locations that are not adequately served by conventional base stations or to distribute capacity from centralized radio suites. These systems typically include a host unit and a plurality of remote units. The host unit is typically coupled between a base station or radio suite and the plurality of remote units in one of many possible network configurations, e.g., hub and spoke, daisy-chain, or branch-and-tree. Each of the plurality of remote units includes one or more antennas that send and receive wireless signals on behalf of the base station or radio suites.

One common issue in distributed antenna systems is adjusting for the different delay associated with each of the remote units. Each remote unit is typically located at a different distance from the host unit. To allow the various antennas to be synchronized, a delay value is typically set at each remote unit. Unfortunately, conventional techniques used to establish the delay for the various remote units have added significant complexity and/or cost to the distributed antenna system. For example, some common network synchronization techniques involve the use of various locating technologies (e.g., global positioning systems, or GPS) that add further complexities and cost to operating these distributed antenna systems reliably and efficiently.

For the reasons stated above and for other reasons stated below which will become apparent to those skilled in the art upon reading and understanding the present specification, there is a need in the art for improvements in delay management for distributed communications networks.

SUMMARY

In one embodiment, a method for managing delay between nodes in a network having a plurality of nodes coupled together by a plurality of links is provided. The method comprises discovering a transport delay value for each of the plurality of links. At a first one of the plurality of nodes, the method generates a signal path delay value for each of the plurality of nodes coupled to the first one of the plurality of nodes using the discovered transport delay value associated with a link of the plurality of links that couples that node to the first one of the plurality of nodes and passes the generated signal path delay values over the links to the nodes of the plurality of nodes coupled to the first one of the plurality of nodes. At each additional node of the plurality of nodes, the method stores a received signal path delay value for the additional node to enable management of the delay for the additional node, generates a signal path delay value for each adjacent node of the plurality of nodes coupled to the additional node using the received signal path delay value and the discovered transport delay value for the link between the additional node and the adjacent node, and passes the generated signal path delay values over the additional links to the adjacent nodes.

DRAWINGS

These and other features, aspects, and advantages are better understood with regard to the following description, appended claims, and accompanying drawings where:

FIGS. 3 and 3A are block diagrams of a data packet in an application framework for a distributed communications network.

DETAILED DESCRIPTION

Figure 1:
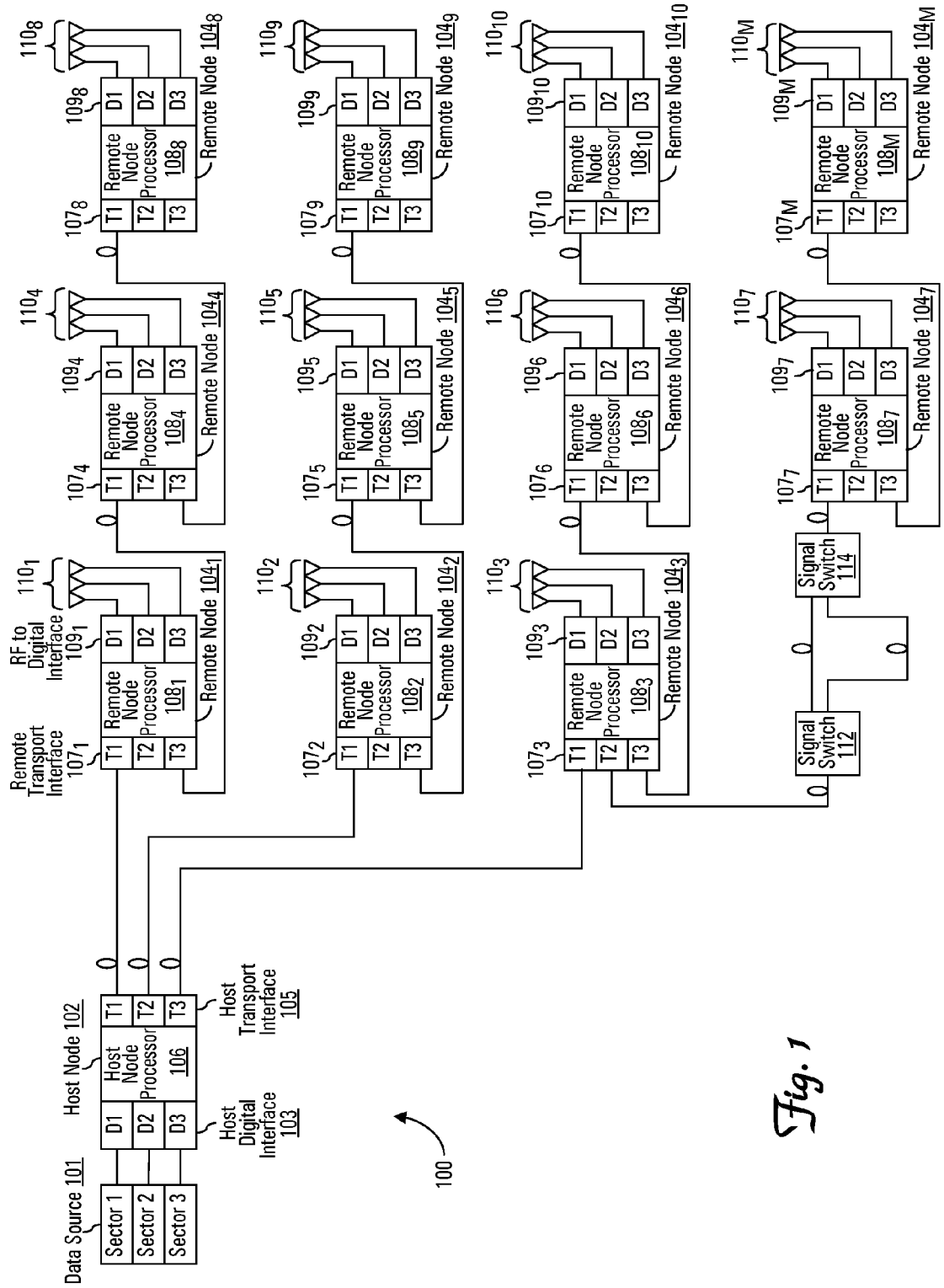
FIG. 1 is a block diagram of a distributed communications network.

The following detailed description relates to delay management for distributed communications networks, e.g., a distributed antenna system. The delay management discussed here enables a network manager to establish a desired delay at a plurality of nodes in a point-to-multipoint communications network with a suitably high degree of repeatability and control. The desired delay can be for each of the nodes collectively or for each individual node. Advantageously, the communications network discussed here uses a distributed approach to determine a signal path delay from a host to each node in the system. This is accomplished at each node by discovering a transport delay (e.g., the travel time) over the link between the node and its adjacent (e.g., successive) nodes in the network. For example, each of the nodes learns the distance between itself and any downstream, adjacent nodes. Based on these transport delays between nodes, the nodes in the system cooperate to determine the signal path delay for each remote node relative to the host node. Furthermore, in determining the signal path delay, each node also accounts for individual internal processing delays of the nodes. Once the signal path delays are determined, the desired delay at each remote node can be definitively established by accounting for the signal path delay back to the host node and any known internal processing delays.

In one implementation, the delay management discussed here incorporates the use of a delay monitor channel and a delay management channel in a data frame. The delay monitor and delay management channels are used to communicate data between nodes to establish a common time base for the network without using excessive overhead. To establish the common time base, the nodes determine the transport delay between nodes using the delay monitor channel as described in more detail below. The nodes further transmit data, e.g., the signal path delay values, in the delay management channel to their adjacent nodes. Each node further combines the transport delay to a succeeding node determined using the delay monitor channel with a signal path delay received over the delay management channel and a respective internal processing delay. This value is in turn passed over the delay management channel to the adjacent node as a signal path delay for that node. The plurality of nodes thus propagates the accumulated delay to successive nodes until all terminating nodes in the network have received a signal path delay back to the host node. In this manner, every remote node in the system is constantly aware of its distance (in signal time) from the host node. This allows each remote node to independently adjust the delay of its transmissions to maintain a selected delay in the system at each of the nodes.

Furthermore, the delay management discussed here does not require the use of additional node positioning and timing techniques (e.g., using GPS) to synchronize message delivery between the nodes. Rather than rely on a separate system (e.g., GPS timing references) to determine the timing delay between each of the nodes, the delay monitor and management channels provide a substantially simplified means of determining signal path delays between each of the nodes.

The delay management technique described herein is topology independent. The delay management technique is applicable to a wide range of network topologies, e.g., star, tree and a daisy-chain network configuration (and combinations thereof). Moreover, this delay management is medium-independent, and functions on a plurality of network infrastructures, such as wireless, free space optics, millimeter wave, twisted pair, coaxial, optical fiber, hybrid fiber, and suitable combinations thereof.

FIG. 1 is a block diagram of an embodiment of a communications network 100. The communications network 100 represents a point-to-multipoint communications network that comprises a data source 101, a host node 102 responsive to the data source 101, and remote nodes $104_1$ to $104_M$ in communication with the host node 102. The host node 102 comprises a host digital interface 103 and a host transport interface 105 responsive to a host node processor 106. Each of the remote nodes $104_1$ to $104_M$ comprises a remote transport interface $107_1$ to $107_M$ and an RF to digital interface $109_1$ to $109_M$ responsive to a remote node processor $108_1$ to $108_M$. Each of the RF to digital interfaces $109_1$ to $109_M$ is further responsive to antenna ports $110_1$ to $110_M$, respectively. In one implementation, the host node processor 106 and each of the remote node processors $108_1$ to $108_M$ comprise at least one of a microcontroller, an application-specific integrated circuit (ASIC), a field-programmable gate array (FPGA), a field-programmable object array (FPOA), or a programmable logic device (PLD). It is understood that the network 100 is capable of accommodating any appropriate number of remote nodes $104_1$ to $104_M$ (e.g., at least one remote node 104 with at least one remote transport interface 107, remote node processor 108, RF to digital interface 109, and antenna port 110) in a single network 100.

The host node 102 and the remote nodes $104_1$ to $104_M$ are communicatively coupled by a plurality of signal paths in a tree-and-branch network configuration representing a plurality of levels. In the example embodiment of FIG. 1, the tree-and-branch network configuration further includes signal switches 112 and 114. Each of the signal paths illustrated in FIG. 1 are at least one of an electrical link, an optical fiber link and a wireless transport link (e.g., millimeter wave, free space optics, or suitable combinations thereof), providing a medium-independent network architecture. It is understood that additional network configurations (e.g., a hub and spoke, a common bus, and the like) are also contemplated.

The host digital interface 103 and each of the RF to digital interfaces 109 include ports D1, D2, and D3. The ports D1, D2, and D3 are considered representative of a plurality of signal interface connections (e.g., RF, Ethernet, and the like) for the host digital interface 103 and each of the RF to digital interfaces 109. Similarly, the host transport interface 105 and each of the remote transport interfaces 107 include ports T1, T2, and T3. The ports T1, T2, and T3 are considered representative of a plurality of transport interface connections for the host transport interface 105 and each of the remote transport interfaces 107. For example, the host transport interface 105 and each of the remote transport interfaces 107 provide an appropriate signal conversion (e.g., at least one of digital to serial and serial to optical fiber) for each of the remote nodes 104 and the host node 102 of the network 100. It is understood the ports D1 to D3 and T1 to T3 shown in FIG. 1 are not to be considered limiting the number of signal interface and transport ports contemplated by the system discussed here (e.g., the system 100 is capable of accommodating any appropriate number of instances of signal interface and transport ports).

Each remote node $104_1$ to $104_M$ introduces one or more intrinsic processing delays. For example, the remote transport interfaces 107 includes a first intrinsic processing delay when passing signals between the transport interface connections T1 and T3 (commonly referred to as a "fiber-to-fiber" delay in this example). Similarly, each of the RF to digital interfaces 109 includes a second intrinsic processing delay for converting signals between digital and RF. In some instances, the intrinsic processing delays in RF to digital interface 109 are asymmetrical. This means that the intrinsic processing delay for upstream signals (signals going to the host 102) and the intrinsic processing delay for downstream signals (signals coming from the host 102) are different. In one implementation, the various intrinsic processing delays are embedded in each of the remote node processors $108_1$ to $108_M$ for use in establishing the requested delay for the node.

In operation, network 100 implements a distributed process for determining the signal path delay for each node in the network 100 back to host node 102. In this distributed process, each node in the network 100 discovers individual transport delays to any adjacent nodes (e.g., any nodes adjacent to the host node 102 or the remote nodes $104_1$ to $104_{10}$ in the downstream direction). Beginning at the host node 102, a signal path delay value based on the transport delay discovered for each of the adjacent nodes is generated and passed on to the adjacent nodes. For each succeeding level of the adjacent nodes in the network 100 (if any exist), the remote nodes $104_1$ to $104_M$ each aggregate the signal path delay for that node with the transport delay to the next, adjacent node and propagate a signal path delay value for the adjacent node to the adjacent nodes in that level. This process of aggregating the received signal path delay with the known transport delay to adjacent nodes and passing on a signal path delay is repeated until all of the nodes in the network 100 have a value for their respective signal path delay.

In one embodiment, the transport delay values are discovered using a "ping" message sent to the adjacent remote node 104. The adjacent remote node 104 returns the message. The transport delay value is based on the time between sending and receiving back the "ping" from each of the remote nodes 104 (e.g., a round trip time). Based on the round trip time, the individual transport delay between each of the pairs of nodes is determined.

Continuing with the example embodiment of FIG. 1, the internal processing delay at each remote node $104_1$ to $104_M$ is also incorporated into the calculation of the signal path delay. For example, remote node $104_1$ generates a signal path delay for remote node $104_4$. This signal path delay includes the signal path delay from host node 102 to remote node $104_1$ as stored in remote node $104_1$ plus the transport delay discovered by remote node $104_1$ between $104_1$ and $104_4$. This signal path delay also includes the intrinsic processing delay of the transport interface $107_1$ of remote node $104_1$ to transport signals from interface T1 to interface T3 (e.g., a "fiber-to-fiber" processing delay).

The remote nodes $104_1$ to $104_M$ use the signal path delay calculated through this process to control the overall delay selected for the remote node. For example, a total delay for each remote node is established during network installation. Each remote node sets the amount of delay that it introduces into signals based on the signal path delay learned using the above-described process. Thus, a common time base is established for the nodes in network 100.

Figure 2:
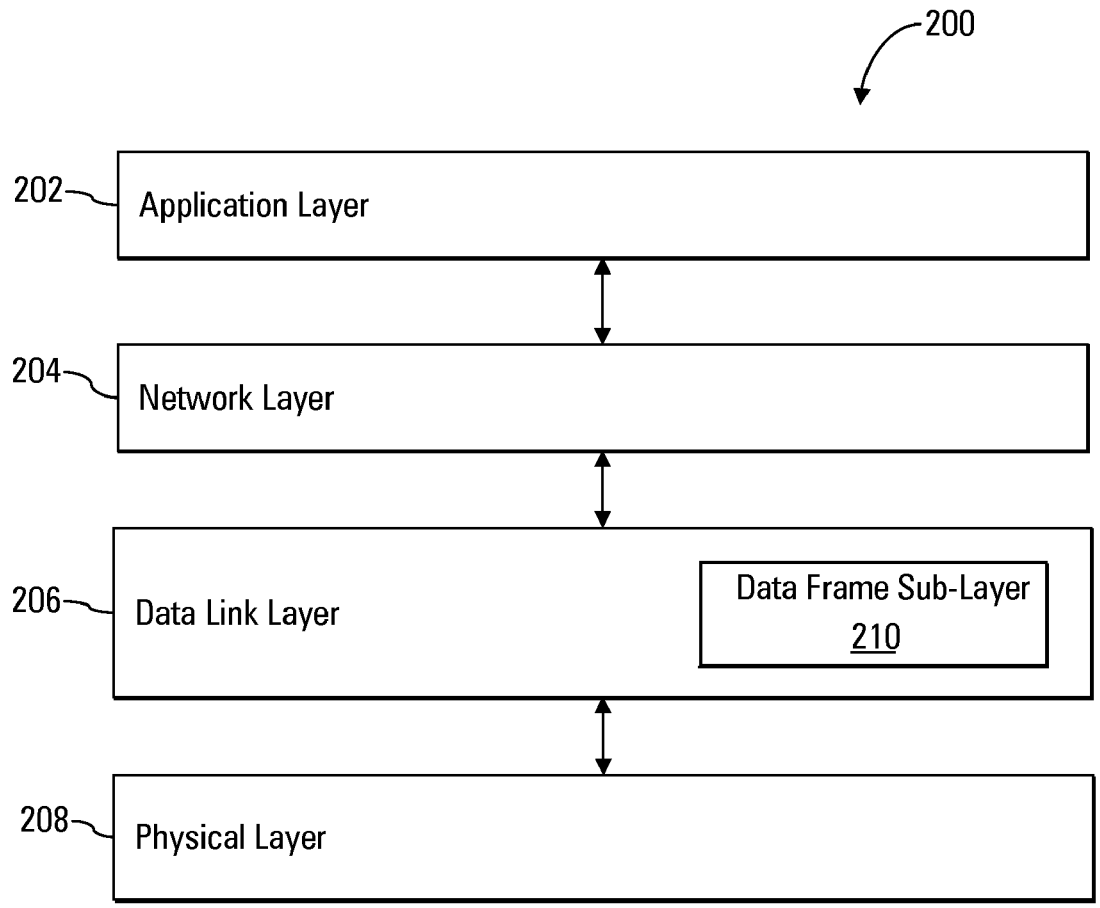
FIG. 2 is a block diagram of an application framework for a distributed communications network.

FIG. 2 is a block diagram of a framework 200 for network applications. The framework 200 comprises multiple layers, discussed below, that provide hardware-related service to enable each node of the network 100 to function as shown above with respect to FIG. 1 (e.g., the host node 102 discovers the plurality of remote nodes 104 over the network 100). The framework 200 comprises an application layer 202, a network layer 204, a data link layer 206, and a physical layer 208. Each layer of the framework 200 compartmentalizes key functions required for any node of the network 100 to communicate with any other node of the network 100.

The physical layer 208 is communicatively coupled to, and provides low level functional support for the data link layer 206, the network layer 204, and the application layer 202. In one implementation, the physical layer 208 resides on at least one of an optical fiber network and a wireless network. The physical layer 208 provides electronic hardware support for sending and receiving data in a plurality of operations from the at least one network application hosted by the host node 102. The data link layer 206 provides error handling for the physical layer 208, along with flow control and frame synchronization. The data link layer 206 further includes a data frame sub-layer 210. The data frame sub-layer 210 comprises a plurality of data frames transferred on the physical layer 208. Additional detail pertaining to the data frame sub-layer 210 is further described below with respect to FIG. 3. The network layer 204 is responsive to at least one programmable processor within the network 100 (e.g., the host node processor 106 or at least one of the remote node processors 108). The network layer 204 provides switching and routing capabilities within the network 100 for transmitting data between the nodes within the network 100. The application layer 202 monitors changes in the transport delay value independent of signal frame traffic to maintain a common time base for signal transmission over the network 100. The application layer 202 is responsive to at least one of a simple network management protocol (SNMP), a common management information protocol (CMIP), a remote monitoring (RM) protocol, and any network communications protocol standard suitable for remote monitoring and network management.

Figure 3:
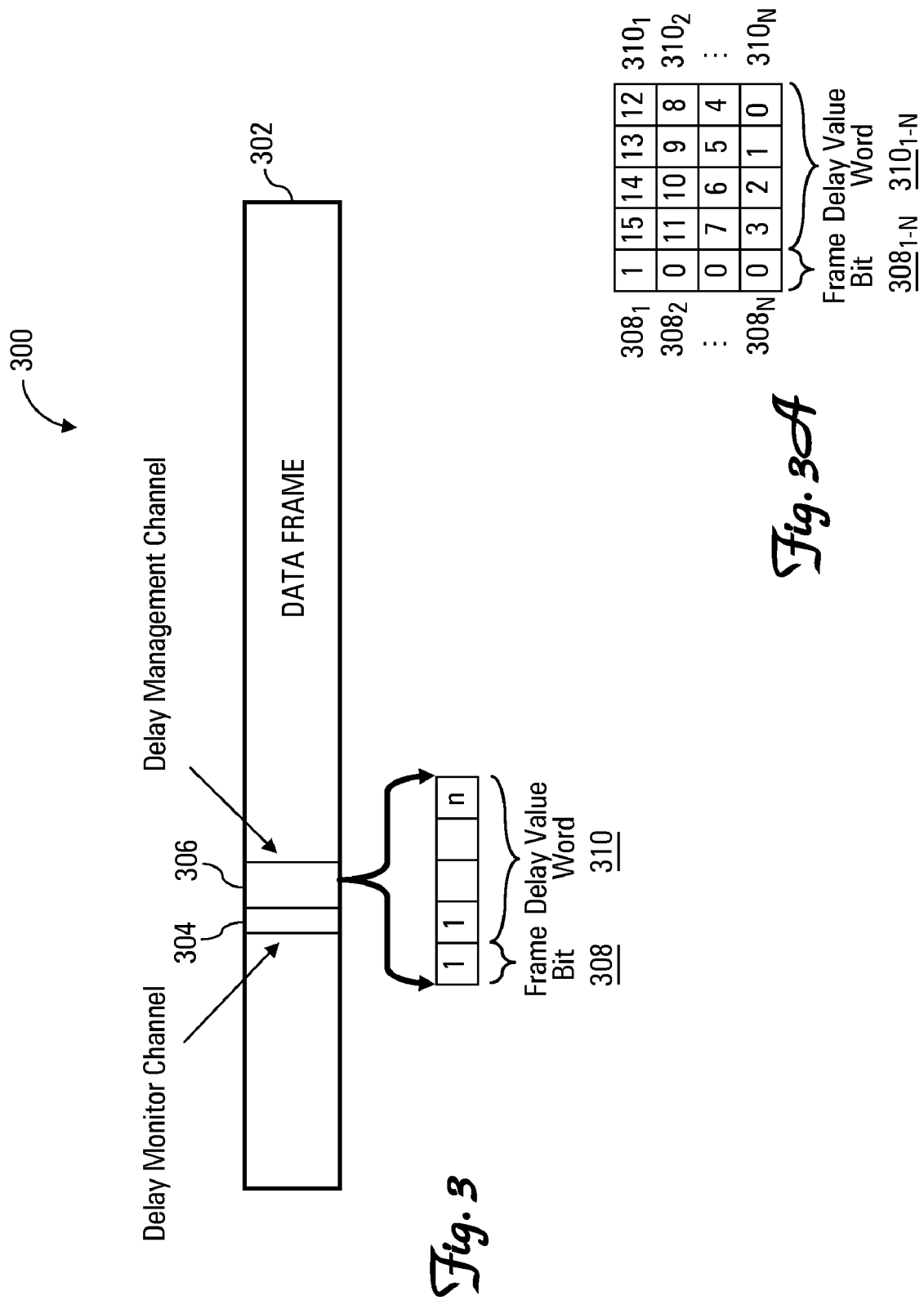

FIG. 3 is a block diagram of an embodiment of the data frame sub-layer 210 of FIG. 2, represented generally by the sub-layer 300. The sub-layer 300 comprises at least one data frame 302 (or optical fiber frame). The at least one data frame 302 further comprises a delay monitor channel 304 and a delay management channel 306. In one embodiment, the delay management channel 306 includes an (optional) framing bit 308 and one or more data bits to carry the signal path delay value. In one embodiment, the delay management channel includes up to 16 data bits. As shown, the delay management channel comprises five bits. In some embodiments, more than the allocated data bits in one frame are needed to transport the signal path delay value. In these instances, the signal path delay value is segmented into groups of bits that are transported in sequential frames of the delay management channel. When the delay is sent on every data frame 302, the framing bit 308 is optional. In one implementation, a framing bit flag may be used to indicate that the signal path delay value was present in the at least one data frame 302. The (optional) framing bit 308 is used to indicate the beginning of the first group of bits by setting the value of the framing bit 308 to 1. For the subsequent groups of bits, the framing bit 308 is set to 0. Thus, for example, a 16-bit signal path delay value is transported over the delay management channel using four frames with the framing bit 308 of the first frame set to 1 as depicted in FIG. 3A. For purposes of this description, this use of multiple frames to carry a signal path delay value is referred to as a delay management "superframe."

In operation, the delay monitor channel 304 is used to determine the so-called "transport delay" between adjacent nodes in the network. A first node uses the delay monitor channel 304 to "ping" the adjacent remote nodes 104 to send back the "ping." This is accomplished by setting the value of the bit in the delay monitor channel 304 to a "1." When the adjacent node receives this ping, the adjacent node returns the ping by setting the delay monitor channel 304 to a "1" in its next frame to the node that initiated the ping. The transport delay value is calculated based on the round trip time between the "ping" and the reply. In one implementation, there are at least two "ping" bits used in the delay monitor channel 305: a forward ping bit and a reverse ping bit. For example, when sending a "request" ping, the forward ping bit is used, and when sending a "response" ping, the reverse ping bit is used. Alternatively, the first node sends the "request" ping, and the adjacent node sends the "response" ping. Moreover, the first node and the adjacent nodes can ping one another for the data bits carrying the signal path delay value.

As discussed in further detail below, the desired end-to-end transport delay between the host node 102 and the remote nodes $104_1$ to $104_M$ is programmable for each of the remote nodes $104_1$ to $104_M$. Moreover, due to the differences in intrinsic processing and signal path delays, each of the remote nodes $104_1$ to $104_M$ adjust the requested total delay to account for these differences.

Transport Delay Management

Returning to FIG. 1, the delay management for the network 100 discussed here is modular and behaves substantially similar for at least one of a star, a daisy-chain, and a tree network configuration. Additionally, the network 100 automatically adjusts for any changes in the delay due to thermal effects, and for any switching protection changes due to, for example, the signal switches 112 and 114. Each of the remote nodes $104_1$ to $104_M$ learn the delay going back to the host node 102 from the delay management channel 306. The delay management discussed here is further divided into at least two distinct operations: (1) Learning a downstream delay (away from the host node 102) to an opposing end of the network 100; and (2) Propagating an accumulated signal path delay throughout the network 100.

Learning the Transport Delay

The host node 102 and each level of the remote nodes $104_1$ to $104_M$ are aware which of adjacent remote nodes 104 are downstream and which are upstream. This information is determined in the discovery of the remote nodes 104 as they are introduced into the network 100. In one embodiment, the nodes use the delay monitor channel to determine the transport delay for the nodes that are adjacent to the node in the downstream direction (away from the host node 102).

In one implementation, each signal path is defined as at least one of a master and a slave signal link, where a downstream signal link for a particular remote (host) node 104 (102) is defined as the "master" signal link, and an upstream signal link for the same node is defined as the "slave" signal link. Moreover, all signal paths coupled to the host node 102 are designated as master signal links. On each "master" signal link, at least one of the applicable host node or a remote node 104 periodically sets the "ping" bit in the delay monitor channel 304. The node then receives responses in subsequent data frames 302 sent in corresponding slave signal links. The round trip delay is measured for the remote node associated with the master link. The transport delay for the remote node is determined from this round trip delay by at least one of the following methods.

A first method involves dividing the round trip delay by two. This round trip value includes a "turn-around" delay from when the remote node received the "ping" on the master link and when the remote node returns the next frame with the bit set in the delay monitor channel on the slave link. This method has a resolution of ±½ frames.

A second method uses inter-node communication to inform the node calculating the transport delay as to the value of the "turn-around" delay. In this process, the node calculating the transport delay subtracts off the "turn-around" delay from the round trip delay prior to dividing the round trip delay by two. This method has a resolution of ±1 clock cycle.

A third method uses a preconfigured "turn-around" delay. The turn-around delay is set to a known value. The turn-around delay is subtracted off as in the second method described above with the same resolution.

Propagation of Signal Path Delay

Once the transport delay value is determined, the nodes of network 100 propagate the signal path delay from node to node. For example, host node 102 uses the discovered transport delay values for remote nodes $104_1$ to $104_3$ to generate and send signal path delay to the remote nodes $104_1$ to $104_3$. In turn, each of remote nodes $104_1$ to $104_3$ use the received signal path delay as a basis, along with the transport delay they discovered to their respective adjacent nodes, to generate and send signal path delay information to their adjacent nodes. In this manner, the signal path delay values are propagated through the network 100.

Setting the Delay Values

As discussed above, setting the desired end-to-end transport delay will account for differences in intrinsic processing delay and the differences in signal path delays in the remote nodes $104_1$ to $104_M$. In at least one implementation, the desired end-to-end transport delay is fixed. The remote node processor 108 in each of the remote nodes 104 receives a request to set the fixed delay value (e.g., from an SNMP agent present in the application layer 202) at each of the antenna ports 110 to a specified value. The SNMP agent in the application layer 202 subtracts off any known intrinsic processing delays as well as the signal path delay back to the host unit 102 that has been learned as described above. It is noted that in some embodiments, the intrinsic processing delays may vary for both downstream and upstream signals (also known as forward and reverse paths, respectively). As shown below, Equations 1 and 2 illustrate the calculation of the delay that is implemented, e.g., in a FIFO at the remote node, for the forward and reverse paths at the remote node:

$$\text{DELAY}_{FWD} = (\text{Delay}_{Requested}) - (\text{Delay}_{signal\text{-}path}) - (\text{Delay}_{Intrinsic\text{-}SD}) - (\text{Delay}_{Forward\text{-}RF}) \quad \text{(Equation 1)}$$

In this equation, the delay that is implemented in the forward path (signals from the host) is the requested delay reduced by three factors; the signal path delay received over the delay management channel ($\text{Delay}_{signal\text{-}path}$), the intrinsic processing delay of the serial to digital conversion ($\text{Delay}_{Intrinsic\text{-}SD}$) of the transport interface 107 and the intrinsic delay in the RF to digital conversion ($\text{Delay}_{Forward\text{-}RF}$) of the RF to digital interface 109.

$$\text{DELAY}_{REV} = (\text{Delay}_{Requested}) - (\text{Delay}_{signal\text{-}path}) - (\text{Delay}_{Intrinsic\text{-}SD}) - (\text{Delay}_{Reverse\text{-}RF}) \quad \text{(Equation 2)}$$

In this equation, the delay that is implemented in the reverse path (signals to the host) is the requested delay reduced by three factors; the signal path delay received over the delay management channel ($\text{Delay}_{signal\text{-}path}$), the intrinsic processing delay of the serial to digital conversion ($\text{Delay}_{Intrinsic\text{-}SD}$) of the transport interface 107 and the intrinsic delay in the RF to digital conversion ($\text{Delay}_{Reverse\text{-}RF}$) of the RF to digital interface 109.

With respect to Equations 1 and 2 above, each of the delays that are subtracted from the Requested Delay is available at the time of the request. Moreover, any request to set a delay that results in a value that is less than zero or greater than $\text{DELAY}_{MAX}$ results in a non-operative command.

The data in a communications channel frame (such as the data frame 302) includes framing information, data integrity information (e.g., at least one of forward error correction and cyclical redundancy checking), and the payload data. The addition of the delay monitor channel 304 and the delay management channel 306 allows the network 100 to automatically synchronize message delivery and propagate end-to-end signal path timings for the antenna ports 110. The delay management methods discussed here provides the host node 102 and each of the remote nodes $104_1$ to $104_{10}$ with a total signal path delay within the network 100. Moreover, these methods allow each of the remote nodes $104_1$ to $104_{10}$ to independently adjust the transport delay value to maintain a common timing base throughout the network 100.

Figure 4:
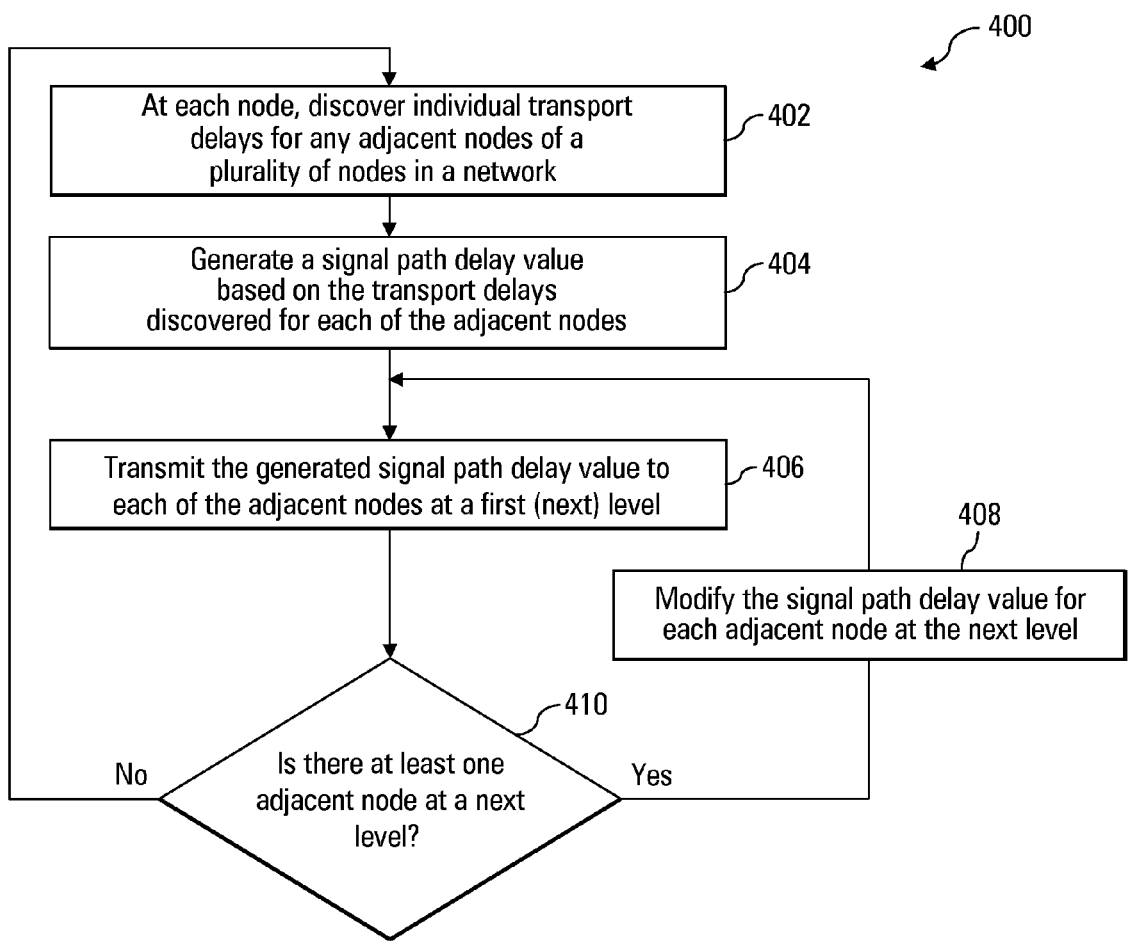
FIG. 4 is a flow diagram illustrating a method for delay management in a distributed communications network.

FIG. 4 is a flow diagram illustrating a method 400 for managing transport delays in a distributed communications network (e.g., the network 100). For example, the method 400 addresses managing the transport delay between remote nodes and a host node in a point-to-multipoint communications network similar to that of the network 100. Advantageously, the network 100 uses the transport delay management described in FIG. 4 to continuously monitor and automatically adjust the signal path delays for the plurality of nodes and achieve the common time base discussed above with respect to FIG. 3.

At block 402, the network 100 discovers individual transport delays for any adjacent nodes in the network 100. In one implementation, the host node and each of the remote nodes record the individual transport delays between their respective adjacent nodes. At block 404, the network 100 generates a signal path delay value based on the transport delays discovered in block 402. In one implementation, the host node and each level of the remote nodes account for internal processing delays (e.g., processing delays for transport interfaces in the network 100) in calculating the signal path delay. At block 406, the network 100 propagates the signal path delay value to each of the adjacent nodes in a first (next) level. At block 408, the signal path delay value is modified at each of the adjacent nodes for the first (next) level of adjacent nodes, if any are available (block 410) and continues to propagate the modified signal path delay value until the each level of the adjacent nodes in the network 100 has a signal path delay value. The signal path delay management illustrated in FIG. 4 asynchronously adjusts the signal path delay value to achieve the common time base between each of the antenna ports of the network 100.

While the embodiments disclosed have been described in the context of a distributed communications network, apparatus embodying these techniques are capable of being distributed in the form of a machine-readable medium, or storage medium, of instructions and a variety of program products that apply equally regardless of the particular type of signal bearing media actually used to carry out the distribution. Examples of machine-readable media, or storage media, include recordable-type media, such as a portable memory device; a hard disk drive (HDD); a random-access memory (RAM); a read-only memory (ROM); transmission-type media, such as digital and analog communications links; and wired or wireless communications links using transmission forms, such as radio frequency and light wave transmissions. The variety of program products may take the form of coded formats that are decoded for actual use in a particular distributed communications network by a combination of digital electronic circuitry and software residing in a programmable processor (e.g., a special-purpose processor or a general-purpose processor in a computer).

At least one embodiment disclosed herein can be implemented by computer-executable instructions, such as program product modules, which are executed by the programmable processor. Generally, the program product modules include routines, programs, objects, data components, data structures, and algorithms that perform particular tasks or implement particular abstract data types. The computer-executable instructions, the associated data structures, and the program product modules represent examples of executing the embodiments disclosed.

This description has been presented for purposes of illustration, and is not intended to be exhaustive or limited to the embodiments disclosed. Variations and modifications may occur, which fall within the scope of the following claims.

What is claimed is:

1. A method for managing delay between nodes in a network having a plurality of nodes coupled together by a plurality of links, the method comprising:
   discovering a transport delay value for each of the plurality of links;
   at a first one of the plurality of nodes,
      generating a signal path delay value for each of a first subset of nodes of the plurality of nodes coupled to and adjacent to the first one of the plurality of nodes, in at least one of a downstream direction or an upstream direction, using the discovered transport delay value associated with a link of the plurality of links that couples each of the first subset of nodes to the first one of the plurality of nodes;
      passing the generated signal path delay values over the links to the first subset of nodes coupled to and adjacent to the first one of the plurality of nodes; and
   at each additional node of the plurality of nodes,
      receiving the signal path delay value corresponding to the additional node from one of the plurality of nodes,
      storing the received signal path delay value corresponding to the additional node to enable management of the delay for the additional node,
      generating an additional signal path delay value for each of an additional subset of nodes of the plurality of nodes coupled to and adjacent to the additional node using the received signal path delay value and the discovered transport delay value associated with a link of the plurality of links that couples each of the additional subset of nodes to the additional node, and
      passing the additional generated signal path delay values over the additional links to the adjacent nodes.

2. The method of claim 1, wherein discovering a transport delay value comprises:
   sending a first signal over a link from one node to an adjacent node of the plurality of nodes;
   receiving a second signal back over each link from the adjacent node to the one node of the plurality of nodes; and
   calculating the transport delay value for the link based on the timing of the sending of the first signal and the receipt of the second signal.

3. The method of claim 2, wherein sending a first signal comprises setting a bit over at least one of a wireless, free space optics, millimeter wave, twisted pair, coaxial, optical fiber, and hybrid fiber interface.

4. The method of claim 2, wherein calculating the transport delay value comprises:
   determining a round trip delay between the one node and the adjacent node; and
   dividing the round trip delay in half.

5. The method of claim 2, wherein calculating the transport delay value comprises:
   communicating the turn-around delay of the adjacent node to the one node;
   determining the round trip delay between the one node and the adjacent node;
   subtracting the turn-around delay from the round trip delay to produce a corrected round trip delay; and
   dividing the corrected round trip delay by two.

6. The method of claim 2, wherein calculating the transport delay value comprises:
   establishing a turn-around delay known to the one node;
   determining the round trip delay between the one node and the adjacent node;
   subtract the turn-around delay from the round trip delay to produce a corrected round trip delay; and
   divide the corrected round trip delay by two.

7. The method of claim 1, wherein passing the generated signal path delay values comprise passing the generated signal path delay values using a delay management channel.

8. The method of claim 1, wherein passing the generated signal path delay values comprises passing the generated signal path delay values using a delay management channel with an optional framing bit and a plurality of data bits.

9. The method of claim 8, wherein passing the generated signal path delay values comprises segmenting the signal path delay value over the delay management channel using the optional framing bit.

10. The method of claim 1, wherein generating the signal path delay value comprises adding an intrinsic delay value for the node generating the signal path delay value.

11. The method of claim 1, further comprising setting a delay for each of the plurality of nodes based on the signal path delay value.

12. A communications network, the network comprising:
   a host node including a host node processor;
   a plurality of remote nodes in communication with the host node, the plurality of remote nodes each including a remote node processor;
   wherein the host processor comprises program instructions that:
      discover a transport delay for each of a first subset of nodes of the plurality of remote nodes that are coupled to and adjacent to the host node, and
      calculate a signal path delay value for each of the first subset of nodes based on the transport path delay discovered for the first subset of nodes; and
   wherein each of the remote node processors comprises program instructions that:
      discover a transport delay for each of a second subset of nodes of the plurality of remote nodes that are coupled to and adjacent to the remote node, and
      calculate a signal path delay value for each of the second subset of nodes based on the transport delay discovered for the second subset of nodes and a received signal path delay value.

13. The communication network of claim 12, wherein the host processor discovers the transport delay by pinging the remote nodes that are adjacent to the host node.

14. The communication network of claim 12, wherein the host node and the plurality of remote nodes are coupled by at least one of optical fiber, free space optics, coaxial cable, twisted pair, and millimeter wave wireless links.

15. The communication network of claim 12, wherein the remote node processors further use an intrinsic processing delay to calculate the signal path delay value.

16. The communication network of claim 12, wherein the remote node processor further includes program instructions that establish a selected delay for the remote node based on a selected delay and the received signal path delay value for the remote node.

17. The communication network of claim 12, wherein the plurality of remote nodes are communicatively coupled to the host node in at least one of a tree and branch network configuration, a hub and spoke network configuration, and a common bus configuration.

18. The communication network of claim 12, wherein each of the remote nodes comprise a remote antenna unit.

* * * * *

UNITED STATES PATENT AND TRADEMARK OFFICE
CERTIFICATE OF CORRECTION

PATENT NO. : 7,948,897 B2
APPLICATION NO. : 11/839086
DATED : May 24, 2011
INVENTOR(S) : Stuart It is certified that error appears in the above-identified patent and that said Letters Patent is hereby corrected as shown below:

On the front page of the patent, under Inventors, delete "John M. Hedin, Coon Rapids, MN (US)"

Signed and Sealed this
Sixth Day of December, 2011

David J. Kappos
*Director of the United States Patent and Trademark Office*